3,326,985
POLYTRIMETHYLENE GLYCOL
Ronald F. Mason, Mill Valley, Calif., assignor to Shell Oil Company, New York, N.Y., a corporation of Delaware
No Drawing. Filed Dec. 29, 1964, Ser. No. 421,987
3 Claims. (Cl. 260—615)

This invention relates to a process for preparing polytrimethylene glycols. Specifically, the invention relates to an improved process for preparing polytrimethylene glycols having an average molecular weight ranging from about 1200 to 1400 and having improved properties.

There is a growing demand for dihydroxy terminated polyethers having an average molecular weight of from 1000 to 1500. Such polyethers are reacted with diisocyanates and chain extending compounds containing active hydrogen atoms to prepare polyurethane elastomers. Polyurethane elastomers prepared from the above referred to polyethers have important potential application in areas, such as, for example, for premium performance spandex fibers, abrasion resistant castings for roller bearings and sheets, and in the formulation of flexible foams. It has been found that polyether type urethanes have superior cushioning characteristics and are less expensive than the polyester type urethanes. Additionally, the polytrimethylene glycol based urethanes possess desirable hydrolytic and ultraviolet stability properties not possessed by the polyester based urethanes.

Since polyethers suitable in formulating polyurethane elastomers must be capable of reacting with diisocyanates, it is imperative that they possess a high dihydroxy termination. The preparation of polytrimethylene glycols having an average molecular weight of up to 900 and a dihydroxy termination of from 95% to 99% is known. Attempts, however, to prepare higher molecular weight polytrimethylene glycols having high functionality (dihydroxy termination) and good chemical properties, such as color, have been unsuccessful. It was found that to produce polytrimethylene glycols having an average molecular weight of from 1000 to 1500 and high dihydroxy termination reaction times of from 50 to 70 hours were required, whereas the polymers having a molecular weight of about 900 required only 20 hours. It was further discovered that the higher molecular weight polytrimethylene glycols were discolored. Attempts to shorten the reaction time by employing higher temperatures and/or larger concentrations of catalyst resulted in polymers having low dihydroxy termination.

It is, therefore, an object of the invention to provide an improved process for preparing polytrimethylene glycol having an average molecular weight of from 1200 to 1400. It is a further object of the invention to provide a process of preparing polytrimethylene glycol having an average molecular weight of from 1200 to 1400, higher dihydroxy termination and less discoloration than heretofore obtainable. It is still a further object to provide a more suitable polytrimethylene glycol of an average molecular weight of from 1200 to 1400 for reaction with diisocyanates in formulating polyurethanes. These and other objects and advantages of the invention will be apparent to one skilled in the art from the following detailed description thereof.

It has now been discovered that these and other objects can be accomplished by an after treatment of polytrimethylene glycol which has an average molecular weight of about 900 and a dihydroxy termination of at least 92% and preferably at least 95% which comprises vacuum stripping said glycol at a temperature in the range of from 220° to 240° C. and at a pressure of from 1 to 8 mm. Hg in a current of nitrogen from 1 to 6 hours.

The expression "percent functionality" as used in this specification denotes percentage of dihydroxy termination of the polymer. The terms "TMG," "poly-TMG 900" and "poly-TMG 1200–1400" denote trimethylene glycol, polytrimethylene glycol having an average molecular weight of 900 and polytrimethylene glycol having an average molecular weight of from 1200 to 1400, respectively.

Vacuum stripping of poly-TMG 900 surprisingly results in an increase of the average molecular weight from about 900 to about 1200 to about 1400 with no detrimental effect on the percent functionality or coloration of the poly-TMG 1200–1400. Poly-TMG 900 is prepared by condensation of TMG at a temperature of from about 175° to 300° C. in the presence of a catalyst. Preferably the catalyst is hydriodic acid and is employed in a concentration ranging from about 0.0006 to 0.01 equivalent per 100 grams of TMG. High dihydroxy termination of the poly-TMG is achieved by employing 0.003 equivalent hydriodic acid. At this catalyst concentration, however, the reaction time for preparing poly-TMG 1200–1300 is in the neighborhood of from 50 to 70 hours. The process of this invention, therefore, has provided a practical means of obtaining poly-TMG 1200–1400 with a high percent functionality and at a significantly reduced reaction time.

The process of this invention is illustrated by the following examples.

*Example 1*

Preparation of poly-TMG 900:
TMG is charged into a flask equipped with stirrer, nitrogen inlet which is below the liquid level, nitrogen outlet at the top of flask, thermometer and separator at room temperature. Nitrogen is introduced into the flask at the rate of from 125 to 150 ml./min. 0.003 equivalent of hydriodic acid per 100 grams of TMG is added to the flask and the contents thereof rapidly brought to a temperature of from 160°–165° C. with moderately rapid stirring. The temperature is raised to 240° C. at a rate of 3° C./hr. and maintained at 240° C. while maintaining a nitrogen purge. Samples are removed periodically to determine the molecular weight of the product. A molecular weight of about 900 is obtained after about 20 hours.

Vacuum Stripping of Poly-TMG 900:
The nitrogen outlet is connected to vacuum and the pressure in the flask is reduced to from 1 to 8 mm. Hg. Nitrogen is introduced into the flask through the nitrogen-inlet while maintaining the poly-TMG 900 product at a temperature of from 220° to 240° C. These conditions are maintained from 1 to 6 hours.

Table 1 below gives results obtained in vacuum stripping of poly-TMG 900 at conditions stated therein. The table compares the characteristics of poly-TMG 900 and of poly-TMG 1200–1400 resulting from vacuum stripping.

TABLE 1.—VACUUM STRIPPING OF POLY-TMG 900

| Sample | Treatment | Analysis, eq./100 g. | | | Mol. Wt. Ebull. | Mol. Wt.[1] Calc. | Percent Di-OH Termination [2] Based on | | Volatiles, Percent |
|---|---|---|---|---|---|---|---|---|---|
| | | OH | =CH₂ | I | | | End Groups Only | End Groups and Mol. Wt. | |
| Poly-TMG 900 | None | .205 | .003 | .003 | 928±30 | 946 | 94.3 | 92.6 | |
| Poly-TMG 900 | Stripped with N₂, 230° C., 5-8 mm., 4 hr. | .157 | .003 | .002 | 1,260±40 | 1,230 | 93.1 | 95.4 | 6.9 |
| Poly-TMG 900 | Repeat of above. Stripped with N₂, 230° C., 5 mm., 5 hr. | .159 | .003 | .002 | 1,240±40 | 1,220 | 93.8 | 95.5 | 5.9 |
| Poly-TMG 900 | None | .205 | .003 | .001 | 865±25 | 957 | 96.2 | 86.9 | |
| Poly-TMG 900 | Stripped with N₂, 230° C., 1 mm., 3½ hr. | .161 | .002 | .002 | 1,300±40 | 1,212 | 95.2 | 102.1 | 6.0 |

[1] Assumes all molecules bifunctional.
[2] Assumes all iodide and unsaturate-containing molecules are hydroxy terminated.

*Example 2*

Preparation of poly-TMG 1500 without vacuum stripping:

The procedure of Example 1 as employed to prepare poly-TMG 900 was followed except that a temperature of 275° C. was used and the reaction time required was 44 hours. The characteristics and properties of the poly-TMG produced is compared in Table 2 with the poly-TMG 1200–1400 prepared in Example 1 according to the process of this invention.

TABLE 2.—ANALYSIS OF POLYTRIMETHYLENE GLYCOL

| | Run | End Groups, eq./100 g. | | | Mol. Wt. Ebull. in Dichloroethane | Mol. Wt. Calc.[1] | Percent Dihydroxyl [2] Termination Based On: | |
|---|---|---|---|---|---|---|---|---|
| | | OH | =CH₂ | —I | | | Obs. Mol. Wt. and End Groups | End Groups Only |
| Poly-TMG Mol wt. ~900. Stripped with N₂, 230° C., 1 mm., 3½ hr | 1 | .161 | .002 | .002 | 1,300±40 | 1,212 | 95.2 | 102.1 |
| Poly-TMG Mol wt. ~1,500 | 1 | .130 | .002 | .006 | 1,235±35 | 1,450 | 75.3 | 88.4 |

[1] Assumes all molecules defunctional.
[2] Assumes all iodide or unsaturate containing molecules are hydroxy terminated.

From Examples 1 and 2 it can be seen that vacuum stripping provides an effective and practical means of obtaining poly-TMG 1200–1400 having dihydroxy termination in excess of 95% which was unobtainable by prior means.

I claim as my invention:

1. A process for the preparation of polytrimethylene glycols having an average molecular weight of from about 1200 to about 1400 and an average dihydroxy termination in excess of 95% which comprises vacuum stripping polytrimethylene glycol having an average molecular weight of about 900 in a current of nitrogen at a temperature of from about 220° to 240° C. and at a pressure of from 1 to 8 mm. mercury for sufficient time to obtain polytrimethylene glycol having an average molecular weight of from 1200 to 1400.

2. A process for preparing polytrimethylene glycol having an average molecular weight of from about 1200 to about 1400 and an average dihydroxyl termination in excess of 95% which comprises heating trimethylene glycol at a temperature from about 175° C. to about 300° C. in the presence of about 0.0006 to 0.01 equivalent hydriodic acid per 100 grams of said glycol for about 20 hours to form polytrimethylene glycol having an average molecular weight of about 900 and subsequently vacuum stripping said product in a current of nitrogen at a temperature of from about 220° C. to about 240° C. and at a pressure of from 1 to 8 mm. mercury for from 1 to 6 hours.

3. A process according to claim 2 wherein the trimethylene glycol is heated at a temperature of about 240° C. and the catalyst is present in 0.003 equivalent per 100 grams of said glycol.

References Cited

UNITED STATES PATENTS 2,520,733    8/1950    Morris et al. _____ 260—615

LEON ZITVER, *Primary Examiner.*

H. MARS, *Assistant Examiner.*